(12) United States Patent
Du et al.

(10) Patent No.: US 9,561,988 B2
(45) Date of Patent: Feb. 7, 2017

(54) METHOD FOR PREPARING CONTROLLED RELEASE FERTILIZER WITH WATER-BASED COATING ON THE BASIS OF CLOSED CIRCULATING FLUIDIZED BED, AND DEVICE THEREFOR

(75) Inventors: Changwen Du, Nanjing (CN); Yazhen Shen, Nanjing (CN); Jianmin Zhou, Nanjing (CN)

(73) Assignee: NANJING INSTITUTE OF SOIL CHINESE ACADEMY OF SCIENCES, Jiangsu (CN)

( * ) Notice: Subject to any disclaimer, the term of this patent is extended or adjusted under 35 U.S.C. 154(b) by 352 days.

(21) Appl. No.: 14/388,817

(22) PCT Filed: Apr. 23, 2012

(86) PCT No.: PCT/CN2012/074564
§ 371 (c)(1),
(2), (4) Date: Sep. 29, 2014

(87) PCT Pub. No.: WO2012/146159
PCT Pub. Date: Nov. 1, 2012

(65) Prior Publication Data
US 2015/0210603 A1    Jul. 30, 2015

(30) Foreign Application Priority Data
Apr. 26, 2011 (CN) .......................... 2011 1 0105150

(51) Int. Cl.
*C05G 3/00* (2006.01)
*B05B 13/00* (2006.01)
(Continued)

(52) U.S. Cl.
CPC ............... *C05G 3/0029* (2013.01); *B05B 7/02* (2013.01); *B05B 12/004* (2013.01); *B05B 13/00* (2013.01); *C05G 3/0011* (2013.01); *Y02P 20/123* (2015.11)

(58) Field of Classification Search
None
See application file for complete search history.

(56) References Cited

U.S. PATENT DOCUMENTS 5,211,985 A * 5/1993 Shirley, Jr. ............... B01J 2/16
118/303

* cited by examiner

*Primary Examiner* — Wayne Langel
(74) *Attorney, Agent, or Firm* — Bei & Ocean; George G. Wang

(57) ABSTRACT

Disclosed is a method for making a controlled release fertilizer with water-based coating using a closed large numerically controlled fluidized bed and a device therefor: collecting a granular fertilizer with a suitable granule size into a barrel; sucking the same into a coating cavity by negative pressure and making the same fluid; directing a water-based coating liquid into a spray gun, then spraying the liquid onto the surface of the fertilizer granules after nebulization; collecting the impurities in the air discharged from the coating cavity by means of a cyclone separator; dehumidifying the air discharged from the cyclone separator by means of a fluidized drying tower; and then the coating is completed. The closed large numerically controlled fluidized bed coating machine has a fluidized bed coating machine main tower, a cyclone separator, a fluidized drying tower, a blower, a heater, an air compressor, a coating liquid inlet system and a control system, and is characterized in that it has a closed air circulation system, and is provided with a dehumidifying mechanism and a water condensing mechanism for the fluidized drying tower. The present invention can reduce energy consumption, increase heating efficiency and has moisture-absorbing function; it can prevent the spray gun from blocking; it has the function of (Continued)

automatic feeding, which improves the efficiency of coating; therefore it is important for the achievement of a water-based coating process.

4 Claims, 2 Drawing Sheets

(51) Int. Cl.
*B05B 7/02* (2006.01)
*B05B 12/00* (2006.01)

METHOD FOR PREPARING CONTROLLED RELEASE FERTILIZER WITH WATER-BASED COATING ON THE BASIS OF CLOSED CIRCULATING FLUIDIZED BED, AND DEVICE THEREFOR

CROSS-REFERENCE TO RELATED APPLICATIONS

This is a national phase application of PCT/CN2012/074564, filed Apr. 23, 2012, which claims priority from CN Application No. 201110105150.5, filed Apr. 26, 2011 and the content of the prior application is incorporated herein in the entirety by reference.

FIELD OF THE INVENTION

This invention falls into the field of preparing coated controlled release fertilizer, specifically, it relates to a method to prepare controlled release fertilizer with water-based coating using a closed large numerically controlled fluidized bed, and the devices for this method: a large numerically controlled closed fluidized bed coating machine with a fluidized drying tower.

BACKGROUND OF THE INVENTION

Controlled release fertilizer can effectively increase nutrient utilization, save labor and reduce threat to environment, with extensive applications in horticultural plants and cash crops. In China, the production and technology of controlled release compound fertilizer is relatively lagged behind, and the research on high efficient and low-cast equipment is almost a blank, therefore the popularizing of controlled release fertilizer on market has been slow.

Presently in China, two main types of coating machines are used: drum type and fluidized bed type, in the former, as materials are extruded and pressed together, bonding is likely to occur, and the film can be broken when they are separated. In the coating cavity, materials are in an orderless moving status, resulting in uneven coating and waste of coating material. Furthermore, the materials in the system are not in a sealed condition, and the thermal efficiency is low, therefore organic solvent leakage is likely, and it is not easy to recover it. Fluidized bed coating machine is an advanced coating device, as the nebulized particles of coating liquid move in the same moving direction of materials at a high and homogeneous speed, there is no adhesion at the spray port, with a short distance between nebulized particles to material granule surface, making it easy for nebulized particles to spread over the granule surface, saving coating material, and all areas of the granule surface have the same chance to come into contact with nebulized particles, thus ensuring continuous, compacted and homogeneous coating.

Although the fluidized bed coating technology has been in practice for years and the coating principle is relatively mature, there are still many practical problems when it is used in scaled production of coated fertilizer, for example, as the current coated fertilizer is mainly coated with organic solvent, the fluidized beds now in use are not suitable to water-based coating. First, during coating in this type of device, the external air is heated via a steam heat exchanger and flows into the coating machine main tower and through the fluidized bed bottom from the bottom to the top as hot air, carrying away the moisture in the coating emulsion and finally exhausted by the ID fan. This open system wastes thermal energy, especially, the air inflow is quite high in large scale coating production, sometimes it is not possible to reach the required air inlet temperature. Second, there are many problems in the air inlet of this type of devices, especially, when some Chinese medicine or urea sensitive to humidity is coated, the uncontrolled humidity can produce substantial environmental effect on the water-based coating. Third, many coating materials, such as acrylic acid emulsion can easily solidify in the spray gun at high temperature, resulting in gun blocking and failure of coating. But low air inlet temperature will lead to incomplete drying, resulting in adhesion. Fourth, as coating involves many parameters, which are directly related to coating quality and output. It is difficult to meet the current technical requirements of coating process repeatability with manual control.

CONTENT OF THE INVENTION

The purpose of this invention is to provide a method to prepare controlled release fertilizer with water-based coating using closed large numerically controlled fluidized bed. And the device used with this preparing method: a large numerically controlled closed fluidized bed coating machine with a fluidized drying tower. In this invention, a closed air circulation system is designed to allow the wet and hot air from the ID fan to flow through a cyclone separator to remove impurities, and be dehumidified in a fluidized drying tower before entering the coating machine main tower again, to realize cyclic utilization of hot air and reduce heat consumption. It can increase heating efficiency and reduce energy consumption; an automatic feeding function is added to reduce labor and increase coating efficiency; smart control is realized for various coating parameters for better repeatability of coating process; and the scope of application to coating materials has been widened, meeting the technical requirements in large scale coating applications.

The plan to fulfill the afore-said invention task is a method to preparing controlled release fertilizer with water-based coating using a closed large numerically controlled fluidized bed, with the following features and steps, (1) Collecting a sieved granular fertilizer with a suitable granule size into a barrel;

(2) Sucking the fertilizer into coating cavity via the automatic feeding system;

(3) Closing the feeding port to change the open system into a closed one. Turn on the ID fan, to make the particle fertilizer in the coating cavity in a spouting fluidized status;

(4) Setting the coating parameters such as air inlet temperature, air outlet temperature, nebulizing pressure, fluidizing pressure and coating time;

(5) After the coating cavity temperature reaches the set air inlet temperature, while agitating, feeding the water-based coating liquid via a peristaltic pump into the spray guns at the bottom of the fluidized bed coating machine main tower;

(6) Turning on the circulating condensate water of the spray gun, and the water-based coating emulsion, after being nebulized by compressed air, is spray coated on the surface of the fertilizer granules.

(7) Air from the coating cavity first flows into the cyclone separator to remove impurities;

(8) Air from the cyclone separator flows into the fluidized drying tower for dehumidifying;

(9) Coating is ended and the coating system is turned off;

(10) Opening the discharge port to collect the coated controlled release fertilizer.

For further optimizing and detail, the specific operations of steps in this invention are as follows:

(1) The granular fertilizer is put into a centrifugal vibrating sieve for sieving, and granular fertilizer with a suitable granule size is collected into a barrel. The said granular fertilizer can be urea, ammonium carbonate, ammonium nitrate, ammonium sulfate, potassium sulfate, potassium chloride, potassium nitrate, diammonium hydrogen phosphate, ammonium dihydrogen phosphate and so on. It can be straight fertilizer or compound fertilizer and homogeneously pelletized inorganic or organic compound fertilizer. Each feed of fertilizer in the coating cavity is 300 kg~700 kg;

(2) Close the air inlet port at the back of coating cavity, open the feeding port and turning on the blower, to build a negative pressure inside the fluidized bed coating cavity to suck the fertilizer into the coating cavity;

(3) Close the feeding port, open the air inlet port at the back of the coating cavity, turn on the lifting on computer screen, to turn the open system into a closed one. Then turn on the ID fan, the inflow air flows through the air dispersion plate at the bottom of the fluidized bed from the bottom, to turn the granular fertilizer on it to a spouting fluidized status, and produce a throwing movement at the top. Adjust the air flow, to keep the fertilizer in a good fluidized status;

(4) Turn on the heating pushbutton and set the coating parameters such as air inlet temperature, air outlet temperature, nebulizing pressure, fluidizing pressure and coating time. The air inlet temperature of the coating machine has a direct influence on coating quality. When the temperature is too high, the nebulizied drops cannot be properly spread on the granule surface, resulting in waste of coating material; when the temperature is too low, incomplete drying will result in adhesion. Air inlet temperature must be set according to the moisture content and glass transition temperature of coating materials of different properties, and is normally set as 30° C.~150° C.;

(5) After the coating cavity temperature reaches the set air inlet temperature, turn on the coating liquid (also referred to as coating material, water-based coating emulsion, or emulsion) feeding system, and set the feeding speed and the whole coating time on the computer screen, to allow the coating liquid to be pumped by a peristaltic pump in continuous agitation into the spray guns at the bottom of the fluidized bed coating machine main tower. The said coating liquid includes one or more of the acrylate and its copolymer emulsion, styrene and its copolymer emulsion, vinyl acetate and its copolymer emulsion. The coated film formed by the coating emulsion accounts for 3%~15% of the granular fertilizer, and the whole coating time is 1~3 h.

(6) Turn on the circulating condensate water of the spray gun, and the coating emulsion, after being nebulized by compressed air, is spray coated on the surface of the fertilizer granules;

(7) The air from the coating cavity, containing impurities and moisture, first flows into the cyclone separator to remove impurities, the cyclone separator is in a large inverted cone design, the cyclone air flow is very high at the bottom and drops sharply at the top, to allow the impurities to settle down and be collected;

(8) Air from the cyclone separator, with very high moisture content, flows into the fluidized drying tower for dehumidifying. The fluidized drying tower is packed with silica gel desiccant in the granular size of 3 mm~30 mm. The larger granular size of desiccant, the less influence on air flow. This drying tower is a fluidized bed, it can realize automatic feeding and discharge of desiccant, extend the contact time of desiccant with wet hot air to increase drying capacity, also with very low influence on the air flow. The dehumidified hot air, with the operation of the ID fan, flows into the coating cavity again to carry away the moisture of the emulsion on the fertilizer granules, forming a closed circulating system;

(9) After the ending of coating, first turn off the coating liquid feeding system, then turn off the nebulizing, heating and air inlet pushbuttons in turn, and finally turn off the lifting pushbutton and the power of the machine;

(10) Open the discharge port at the bottom of fluidized bed coating machine main tower, to collect the coated controlled release fertilizer.

The plan to fulfill the second purpose of this invention is, the afore-said device used in the method to prepared controlled release fertilizer: a closed large numerically controlled fluidized bed coating machine, with the feature that a closed large numerically controlled fluidized bed coating machine with the ordinary open fluidized bed coating machine optimized as a closed type, with a drying tower and a cyclone separator, a circulating condensate water device being used in spray guns, and an automatic feeding system and a smart control system being added.

The Optimized Plan of the Afore-Said Device Includes:

1. A closed air circulation system designed to allow the wet and hot air from the ID fan to flow through a cyclone separator to remove impurities, and be dehumidified in a fluidized drying tower before entering the coating machine main tower again, to realize cyclic utilization of hot air and reduce heat consumption.

2. The said closed air circulation system is provided with a dehumidifying unit, to carry away the moisture in the coating emulsion. The said dehumidifying unit is a drying tower packed with large grains of silica gel, and the air, after dehumidification, flows into the coating machine main tower again. This dehumidifying unit has the repeated dehumidifying function, when the silica gel reaches saturated moisture content, open the feeding port of the fluidized bed coating machine to turn this closed system into an open system, to directly heat up and dry the silica gel instead of materials, so that it will acquire the drying function again. The drying tower designed for this fluidized bed can realize automatic feeding of desiccant, and extend the contact time of desiccant with wet hot air to increase drying capacity, and most important, it has almost no influence on the air flow.

3. The closed air circulation system is provided with a cyclone separator to remove impurities by settling the debris in the circulation system. Impurities are removed periodically to reduce coating load and improve coating homogeneity.

4. In the coating liquid pipes (including emulsion spray guns and their pipes), a condensed water circulating device is provided, to reduce blocking of spray guns caused by early reaction and solidification of emulsion inside the hot spray guns, to widen the scope of application for coating materials, especially those with comparatively low vitrifying temperature.

5. Automatic feeding systems are designed, including automatic feeding of granular fertilizer and desiccant, greatly saving manpower and increasing coating efficiency, and realizing fully automatic coating process. The structure of the automatic feeding systems is: a blower is provided in the coating machine system, to produce a negative pressure in the coating cavity of the fluidized bed, also, the feeding port valves and blower switches are connected with the automatic control mechanism.

6. A smart control system is provided, which consists of the temperature sensor, humidity sensor, feeding control valve, discharge control valve, nebulizing pressure valve, fluidizing pressure valve, and coating speed control valve, and the driving mechanism of such temperature sensor, humidity sensor, feeding control valve, discharge control valve, nebulizing pressure valve, fluidizing pressure valve, and coating speed control valve are connected to a computer, to realize smart control of various coating parameters, improving the repeatability of operation and control. Computer control is adopted, with DLC programming, all coating parameters can be set on the screen to allow dynamic and continuous control of coating process, and realize online printout of parameters, also, pictures can be sent by cameras installed within the fluidized bed coating cavity to the computer, to monitor in real-time the coating status, and the data of the hydroscope installed in the fluidized drying tower can provide information on the drying capacity of desiccant in real-time.

In other words, this invention has provided various effective solutions to problems in the existing technology. First, a closed air circulation system is used to reduce energy consumption and increase heating efficiency. Second, the closed air circulation system is provided with a powerful dehumidifying unit, to carry away the moisture in the coating emulsion. A drying tower packed with large grain silica gel is used as a dehumidifying unit, to realize repeated dehumidifying. Third, a condensed water circulating device is provided in the emulsion spray gun pipes, to reduce blocking of spray guns caused by solidification of emulsion inside the hot spray guns, to widen the scope of application for coating materials, especially those with comparatively low vitrifying temperature. Fourth, automatic feeding systems are designed, including automatic feeding of granular fertilizer and desiccant, greatly saving manpower and increasing coating efficiency, and realizing fully automatic coating process. Fifth, a cyclone separator is designed to settle the debris in the circulating system. Impurities are removed periodically to reduce coating load and improve coating homogeneity. Sixth, smart control is realized for all coating parameters, improving the repeatability of operation and control. Computer control is adopted, with DLC programming, all coating parameters can be set on the screen to allow dynamic and continuous control of coating process, and realize online printout of parameters, also, pictures can be sent by cameras installed within the fluidized bed coating cavity to the computer, to monitor in real-time the coating status, and the data of the hydroscope installed in the drying tower can provide information on the drying capacity of desiccant in real-time.

The optimized closed large fluidized bed coating machine is energy saving and environmental-friendly, can reduce manpower consumption and improve the repeatability of coating process, and also widen the scope of application to coating materials, meeting the technical requirements in large scale coating applications.

This Invention can be Realized with the Following Measures:

An ordinary open type fluidized bed is optimized into a closed large numerically controlled fluidized bed for preparing controlled release fertilizer with water-based coating, and the specific processes consist of design and optimization of six aspects: a powerful dehumidifying unit, circulating condensate water in spray guns, automatic feeding and discharge system, cyclone impurity removing system and smart control.

Closed System

In a traditional open type fluidized bed coating machine, with the operation of the ID fan, the external cold air, after filtering and heating, flows into the coating machine main tower as hot air, to carry away the moisture of the coating emulsion and exhausted out of the system by the ID fan. In this open system, cold air should be heated up in large scale coating operations, not only wasting large amount of thermal energy, it is even difficult to reach the preset air inlet temperature in cold winter, resulting in insufficient drying of coating liquid and adhesion, therefore a closed air circulation system is designed so that the wet and hot air from the ID fan can be cleaned and dehumidified in the drying tower to flow back into the coating machine main tower again, to realize cyclic use of hot air and reduce energy consumption.

Dehumidifying Unit

In a closed air circulation system, a powerful dehumidifying unit is necessary to carry away the moisture in the coating emulsion. The said dehumidifying unit is a fluidized drying tower packed with large grain silica gel, this dehumidifying unit has the repeated dehumidifying function, when the silica gel reaches saturated moisture content and is unable to dehumidify the air, open the feeding port of the fluidized bed coating machine to turn this closed system into an open system, to directly heat up and dry the silica gel instead of materials, so that it will acquire the drying function again. When the dehumidifying function is restored, the feeding port is closed, to turn the open system into a closed one. The dehumidified hot air, with the operation of the ID fan, flows into the coating cavity again to carry away the moisture of the emulsion on the fertilizer granules. The drying tower designed for this fluidized bed can realize automatic feeding of desiccant, and extend the contact time of desiccant with wet hot air to increase drying capacity, and most important, it has almost no influence on the air flow. The desiccant in it is silica gel desiccant in the granular size of 3 mm~30 mm. The larger granular size of desiccant, the less influence on air flow.

Setup of Circulating Condensate Water

The water-based coating emulsion is fed by the feeding system with a peristaltic pump into the spray guns at the bottom of the fluidized bed, and is spray coated onto the surface of the fertilizer granules after being nebulized by compressed air, however, many coating materials with comparatively low vitrifying temperature can easily become solidified in a hot environment, resulting in blocking of spray guns. A circulating condensate water device is provided in the emulsion spray gun pipes, to reduce solidification of emulsion at high temperature, to widen the scope of application for coating materials.

Automatic Feeding System

This coating machine has realized automatic feeding of coating materials and desiccant. In normal coating operation, the system is in a closed status; when fertilizer is to be fed into the machine, the air inlet port at the back of coating cavity is closed, and the feeding port is open and the blower turned on, to build a negative pressure inside the fluidized bed coating cavity, and suck the fertilizer into the coating cavity. When desiccant is to be fed in, close the air outlet port of the drying tower, open the desiccant inlet port and turn on the fan, to build a negative pressure in the tower to suck the desiccant into it. The automatic feeding system design with negative pressure can greatly save manpower and increase coating efficiency, realizing fully automatic coating.

Impurity Removing by Cyclone

In the coating process, coating emulsion may produce debris when solidified in the air, and desiccant will also break to produce impurities in the long time fluidizing and collision, the debris in the system can be made to settle with the cyclone impurity removing system. The cyclone separator is in a large inverted cone design, the cyclone air flow is very high at the bottom and drops sharply at the top, to allow the impurities to settle down and be collected. Impurities are removed periodically to reduce coating load and improve coating homogeneity.

Smart Control

The smart control zone consists of the control host and the connected computer screens, on which coating parameters can be set to allow dynamic and continuous control of coating process. The control zone can control the coating parameters in different parts of the coating machine, for example, the nebulizing status of coating liquid can be regulated via the pressure valve controlling the nebulizing pressure, the coating speed can be controlled via the feeding system, the air flow can be controlled, and further the fluidizing status of fertilizer with the pressure valve of the blower, the air inlet and outlet temperature can be controlled by controlling the heater, also, pictures can be sent by cameras installed within the fluidized bed coating cavity to the computer, to monitor in real-time the coating status, the amount of impurity can be known with the camera installed on the inner wall of the cyclone separator, and the drying capacity of desiccant can be known in real-time with the hydroscope installed in the drying tower. These realize smart control and increase the repeatability in industrial production. They also realize isolation of electrical control from operation environment, and avoid possible safety accident caused by sparks produced in electrical elements.

This invention can increase heating efficiency and reduce energy consumption; an automatic feeding function is added to reduce labor and increase coating efficiency; smart control is realized for various coating parameters for better repeatability of coating process; and the scope of application to coating materials has been widened, meeting the technical requirements in large scale coating applications.

EMBODIMENTS

Figure 1:
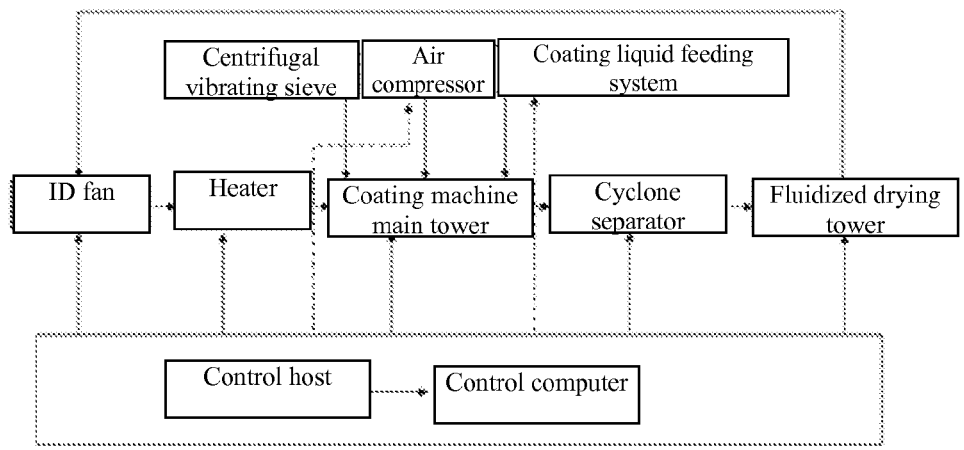
FIG. 1 is the working process flow of a closed large fluidized bed coating machine.

The specific process to prepare controlled release fertilizer using the optimized closed large numerically controlled fluidized bed coating machine with drying tower is as follows:

(1) The granular fertilizer first is put into a centrifugal vibrating sieve for sieving, and granular fertilizer with a suitable granule size is collected into a barrel. The said granular fertilizer can be urea, ammonium carbonate, ammonium nitrate, ammonium sulfate, potassium sulfate, potassium chloride, potassium nitrate, diammonium hydrogen phosphate, ammonium dihydrogen phosphate and so on. It can be straight fertilizer or compound fertilizer and homogeneously pelletized inorganic or organic compound fertilizer. Each feed of fertilizer in the coating cavity is 300 kg~700 kg.

(2) Close the air inlet port at the back of coating cavity, open the feeding port and turn on the ID fan (blower), to build a negative pressure inside the fluidized bed coating cavity, to suck the fertilizer into the coating cavity;

(3) Close the feeding port, open the air inlet port at the back of the coating cavity, turn on the lifting on computer screen, to turn the open system into a closed one. Then the ID fan is turned on, the inflow air flows through the air dispersion plate at the bottom of the fluidized bed from the bottom, to turn the granular fertilizer on it to a spouting fluidized status, and produce a throwing movement at the top. Adjust the air flow, to keep the fertilizer in a good fluidized status.

(4) Turn on the heating pushbutton and set the air inlet temperature and air outlet temperature. The air inlet temperature of the coating machine has a direct influence on coating quality. When the temperature is too high, the nebulized drops cannot be properly spread on the granule surface, resulting in waste of coating material; when the temperature is too low, incomplete drying will result in adhesion. Air inlet temperature must be set according to the moisture content and glass transition temperature of coating materials of different properties, and is normally set as 30° C.~150° C.

(5) After the coating cavity temperature reaches the set air inlet temperature, turn on the coating liquid feeding system, and set the feeding speed and the whole coating time on the computer screen, to allow the coating liquid to be pumped by a peristaltic pump in continuous agitation into the spray guns at the bottom of the fluidized bed coating machine main tower. The said coating materials include one or more of the acrylate and its copolymer emulsion, styrene and its copolymer emulsion, vinyl acetate and its copolymer emulsion. The coated film formed by the coating emulsion accounts for 3%~15% of the granular fertilizer, and the whole coating time is 1 h~3 h.

(6) Turn on the circulating condensate water of the spray gun, and the water-based coating emulsion, after being nebulized by compressed air, is spray coated on the surface of the fertilizer granules.

(7) The air from the coating cavity, containing impurities and moisture, first flows into the cyclone separator to remove impurities, the cyclone separator is in a large inverted cone design, the air flow is very high at the bottom and drops sharply at the top, to allow the impurities to settle down and be collected;

(8) Air from the cyclone separator, with very high moisture content, flows into the fluidized drying tower for dehumidifying. The fluidized drying tower is packed with silica gel desiccant in the granular size of 3 mm~30 mm. The larger granular size of desiccant, the less influence on air flow. This drying tower is a fluidized bed, it can realize automatic feeding and discharge of desiccant, extend the contact time of desiccant with wet hot air to increase drying capacity, also with very low influence on the air flow. The dehumidified hot air, with the operation of the ID fan, flows into the coating cavity again to carry away the moisture of the emulsion on the fertilizer granules.

(9) After the ending of coating, first turn off the coating liquid feeding system, then turn off the nebulizing, heating and air inlet pushbuttons in turn, and finally turn off the lifting pushbutton and the power of the machine.

(10) Open the discharge port at the bottom of fluidized bed coating machine main tower, to collect the coated controlled release fertilizer.

Figure 2:
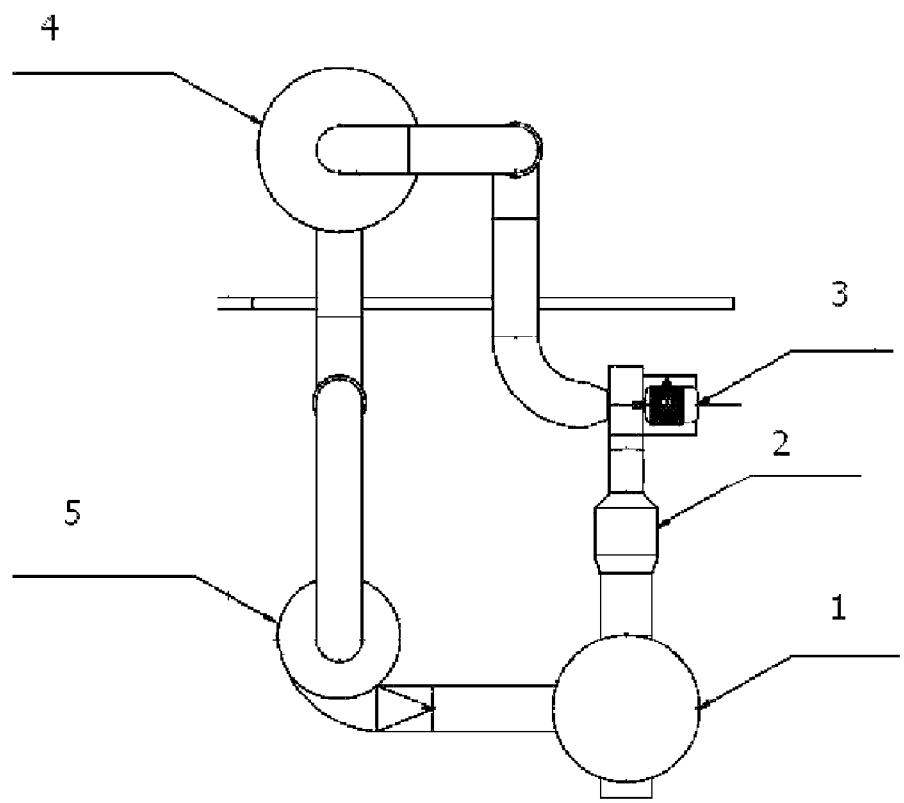
FIG. 2 is the system structure schematic diagram of a closed large fluidized bed coating machine.
Figure 3:
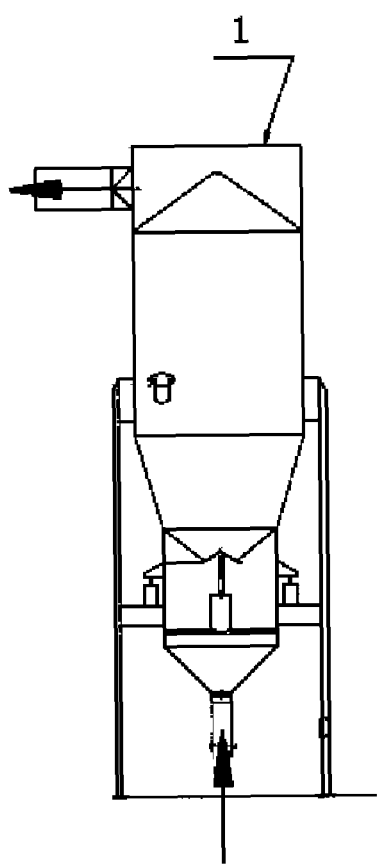
FIG. 3 is the front view of the main tower of the coating machine.
Figure 4:
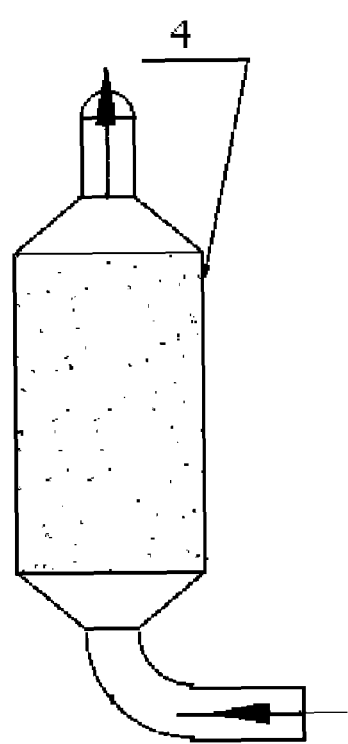
FIG. 4 is the front view of the fluidized drying tower.

Embodiment 1, with reference to FIG. 1, FIG. 2, FIG. 3 and FIG. 4: in the coating machine main tower 1 are provided with the fluidized bed and fertilizer feeding port and discharge port; beneath this fluidized bed is an air dispersion plate, the air duct of the ID fan 3 is connected beneath it to the said air dispersion plate; at the bottom of the said coating machine main tower 1 are provided with coating liquid pipes and coating liquid spray guns, and in this closed air circulation system are provided with heating device (heater) 2, fluidized drying tower 4 and cyclone separator 5. The granular fertilizer is first put into a centrifugal vibrating sieve for sieving, and granular fertilizer with a diameter of 2 mm~3 mm is collected into a barrel. Close the air inlet port at the back of coating cavity, open the feeding port and turn on the ID fan 3 (blower), to build a negative pressure inside the fluidized bed coating cavity, and suck 500 kg of fertilizer into the coating cavity. Close the feeding port, open the air inlet port at the back of the coating cavity, turn on the lifting on computer screen, then turn on the ID fan, the cold air flows through the air dispersion plate at the bottom of the fluidized bed from the bottom to the top, to turn the granular fertilizer on it to a good fluidized status. Turn on the heating pushbutton and set the air inlet temperature at 85° C. and air outlet temperature at 60° C. After the coating cavity temperature reaches 85° C., put the prepared acrylate polymer emulsion containing 50 kg of dry substance into the coating liquid feeding system, and pump the coating emulsion in continuous agitation into the spray guns at the bottom of the fluidized bed coating machine main tower, set the feeding speed at 1.67 kg/min, and the whole coating time as 2 h on the computer screen. Turning on the circulating condensate water of the spray gun, and the coating emulsion, after being nebulized by compressed air, is spray coated on the surface of the fertilizer granules. The air from the coating cavity, after impurity removal in the cyclone separator and dehumidifying in the fluidized drying tower, and with the operation of the ID fan, flows into the coating cavity main tower to fluidize the fertilizer granules again, to carry away the moisture of the emulsion, forming a closed circulation system. After the ending of coating, turn off the coating liquid feeding system, nebulizing, heating and air inlet pushbuttons in turn, and finally turn off the lifting pushbutton and the power of the machine. Open the discharge port at the bottom of fluidized bed coating machine main tower, to collect the coated controlled release fertilizer.

Embodiment 2

When it is necessary to add desiccant into the system, it can be done with the automatic desiccant feeding system. First close the air outlet port of the drying tower, turn on the fan and open the desiccant inlet port, to build a negative pressure in the tower to suck the desiccant into it.

What is claimed is:

1. A method for preparing controlled release fertilizer in a large closed numerically controlled fluidized bed coating machine, comprising the following steps,
   (1) sieving and collecting a granular fertilizer with a predetermined granule size range into a barrel;
   (2) sucking said granular fertilizer into a coating cavity via an automatic feeding system with a feeding port in said coating machine;
   (3) closing said feeding port so that an open system is changed to a closed system, and turning on an ID fan to make said granular fertilizer into a spouting fluidized state in said coating cavity;
   (4) setting coating parameters including air inlet temperature, air outlet temperature, nebulizing pressure, fluidizing pressure and coating time;
   (5) after said coating cavity's temperature reaches a preset air inlet temperature, feeding the coating liquid, which is under constant agitating, via a peristaltic pump into spray guns at the bottom of a main tower of said fluidized bed coating machine;
   (6) Turning on a circulating condensate water of the spray gun, so that said coating liquid, after being nebulized by compressed air, is spray coated on the surface of said granular fertilizer;
   (7) flowing the air from said coating cavity first into a cyclone separator to remove impurities;
   (8) flowing the air from said cyclone separator into a drying tower for dehumidifying so as to result in dehumidified air, which then flows, via said ID fan, into said coating cavity again so as to carry away more moisture from the coating liquid and form a closed circulating drying system to realize the cyclic utilization of hot air and reduce thermal energy consumption;
   (9) turning off said machine upon coating completion; and
   (10) opening a discharge port to collect coated controlled release fertilizer.

2. The method according to claim 1, wherein in step (1) said granular fertilizer is a member or a combination of members selected from the group consisting of urea, ammonium carbonate, ammonium nitrate, ammonium sulfate, potassium sulfate, potassium chloride, potassium nitrate, diammonium hydrogen phosphate, and ammonium dihydrogen phosphate and is a simple fertilizer, compound fertilizer, or homogeneously pelletized inorganic or organic compound fertilizer; wherein in step (2) said coating cavity is filled with 300 kg~700 kg said granular fertilizer each time; and wherein in step (4) said air inlet temperature set to 30~150.

3. The method according to claim 1, wherein in step (5) said coating liquid includes one or more members selected from the group consisting of acrylate and its copolymer emulsion, styrene and its copolymer emulsion, vinyl acetate and its copolymer emulsion.

4. The method according to claim 1, wherein in step (5) a coating formed by said coating liquid accounts for 3%~15% of the granular fertilizer by weight; and coating time in step (5) is 1-3 hours.

* * * * *